(12) United States Patent
Anthony et al.

(10) Patent No.: US 11,518,413 B2
(45) Date of Patent: Dec. 6, 2022

(54) NAVIGATION OF AUTONOMOUS VEHICLES USING TURN AWARE MACHINE LEARNING BASED MODELS FOR PREDICTION OF BEHAVIOR OF A TRAFFIC ENTITY

(71) Applicant: Perceptive Automata, Inc., Boston, MA (US)

(72) Inventors: Samuel English Anthony, Somerville, MA (US); Till S. Hartmann, Boston, MA (US); Jacob Reinier Maat, Boston, MA (US); Dylan James Rose, Boston, MA (US); Kevin W. Sylvestre, Boston, MA (US)

(73) Assignee: PERCEPTIVE AUTOMATA, INC., Boston, MA (US)

( * ) Notice: Subject to any disclaimer, the term of this patent is extended or adjusted under 35 U.S.C. 154(b) by 0 days.

(21) Appl. No.: 17/321,253

(22) Filed: May 14, 2021

(65) Prior Publication Data

US 2021/0354730 A1    Nov. 18, 2021

Related U.S. Application Data

(60) Provisional application No. 63/025,137, filed on May 14, 2020.

(51) Int. Cl.
*B60W 60/00* (2020.01)
*B60W 40/04* (2006.01)
(Continued)

(52) U.S. Cl.
CPC ...... *B60W 60/00274* (2020.02); *B60W 40/04* (2013.01); *B60W 60/00272* (2020.02);
(Continued)

(58) Field of Classification Search
CPC .......... B60W 40/04; B60W 60/00272; B60W 60/00274; B60W 2420/42;
(Continued)

(56) References Cited

U.S. PATENT DOCUMENTS 10,186,123 B2 * 1/2019 Kanaujia .......... G08B 13/19645
10,402,687 B2 9/2019 Anthony et al.
(Continued)

FOREIGN PATENT DOCUMENTS

WO    WO 2019/122414 A1    6/2019
WO    WO 2020/160276 A1    8/2020

OTHER PUBLICATIONS

International Search Report and Written Opinion, Patent Cooperation Treaty Application No. PCT/US2021/032637, dated Aug. 16, 2021, 16 pages.

*Primary Examiner* — Anshul Sood
(74) *Attorney, Agent, or Firm* — Fenwick & West LLP

(57) ABSTRACT

An autonomous vehicle collects sensor data of an environment surrounding the autonomous vehicle including traffic entities such as pedestrians, bicyclists, or other vehicles. The sensor data is provided to a machine learning based model along with an expected turn direction of the autonomous vehicle to determine a hidden context attribute of a traffic entity given the expected turn direction of the autonomous vehicle. The hidden context attribute of the traffic entity represents factors that affect the behavior of the traffic entity, and the hidden context attribute is used to predict future behavior of the traffic entity. Instructions to control the autonomous vehicle are generated based on the hidden context attribute.

20 Claims, 11 Drawing Sheets

(51) Int. Cl.
*G06N 3/08* (2006.01)
*G06V 20/56* (2022.01)

(52) U.S. Cl.
CPC .............. *G06N 3/08* (2013.01); *G06V 20/56* (2022.01); *B60W 2420/42* (2013.01); *B60W 2420/52* (2013.01); *B60W 2554/4044* (2020.02); *B60W 2554/4047* (2020.02)

(58) Field of Classification Search
CPC ..... B60W 2420/52; B60W 2554/4044; B60W 2554/4047; G06K 9/00791; G06N 3/08
See application file for complete search history.

(56) References Cited

U.S. PATENT DOCUMENTS

| | | |
|---|---|---|
| 2012/0143488 A1 | 6/2012 | Othmezouri et al. |
| 2017/0270374 A1* | 9/2017 | Myers ................ G06K 9/00369 |
| 2018/0032891 A1 | 2/2018 | Ba et al. |
| 2018/0157923 A1* | 6/2018 | el Kaliouby, Jr. ........................... G06K 9/00302 |
| 2019/0012574 A1* | 1/2019 | Anthony .............. G06K 9/6254 |
| 2019/0034794 A1* | 1/2019 | Ogale ................ G01C 21/3407 |
| 2019/0079526 A1* | 3/2019 | Vallespi-Gonzalez ....................... G01S 17/931 |
| 2020/0172098 A1* | 6/2020 | Abrahams ............. B60W 10/04 |
| 2020/0207339 A1* | 7/2020 | Neil ...................... G05D 1/0212 |
| 2020/0239026 A1 | 7/2020 | Anthony |
| 2020/0241545 A1 | 7/2020 | Anthony |
| 2020/0247432 A1 | 8/2020 | Misra et al. |

* cited by examiner

NAVIGATION OF AUTONOMOUS VEHICLES USING TURN AWARE MACHINE LEARNING BASED MODELS FOR PREDICTION OF BEHAVIOR OF A TRAFFIC ENTITY

CROSS-REFERENCE TO RELATED APPLICATION

This application claims the benefit of U.S. Provisional Application No. 63/025,137 filed May 14, 2020, which is incorporated by reference in its entirety.

GOVERNMENT SUPPORT STATEMENT

This invention was made with government support under Award No. 1738479 awarded by National Science Foundation's Division of Industrial Innovation and Partnerships (IIP). The government has certain rights in the invention.

TECHNICAL FIELD

The present disclosure relates generally to navigating an autonomous vehicle through traffic and more specifically to machine learning based models for prediction of hidden context associated with traffic entities for use in navigation of autonomous vehicles.

BACKGROUND

An autonomous vehicle uses different types of sensors to receive input describing the surroundings (or environment) of the autonomous vehicle while driving through traffic. For example, an autonomous vehicle may perceive the surroundings using camera images and lidar scans. The autonomous vehicle determines whether an object in the surroundings is stationary, for example, buildings or trees, or the object is non-stationary, for example, a pedestrian, a vehicle, and so on. The autonomous vehicle system predicts the motion of non-stationary objects to make sure that the autonomous vehicle is able to navigate through non-stationary obstacles in the traffic.

Conventional systems predict motion of pedestrians and other vehicles to determine whether they are likely to come in the path of the autonomous vehicle based on past and current motion of the pedestrians and other vehicles. The autonomous vehicle navigates through traffic so as to avoid collisions with any pedestrians or other vehicles. However, conventional techniques fail to accurately predict motion of certain non-stationary objects for example, pedestrians, bicyclists, and so on. For example, if the autonomous vehicle detects a pedestrian standing in a street corner, the current motion of the pedestrian alone does not provide enough information for predicting whether the pedestrian will cross the street or whether the pedestrian will remain standing on a street corner. Similarly, if the autonomous vehicle detects a bicyclist in a lane, the current motion of the bicycle does not provide enough information for predicting whether the bicycle will change lanes.

Failure of autonomous vehicles to accurately predict motion of non-stationary traffic entities results in unnatural movement of the autonomous vehicle, for example, as a result of the autonomous vehicle suddenly stopping due to a pedestrian moving in the road or the autonomous vehicle continuing to wait for a person to cross a street even if the person never intends to cross the street.

SUMMARY

Embodiments of the system predict hidden context attributes associated with traffic entities to determine behavior of these traffic entities in the traffic. The traffic entities represent non-stationary objects in the traffic in which the autonomous vehicle is driving, for example, a pedestrian, a bicycle, a vehicle, a delivery robot, and so on. Hidden context attributes include factors that affect the behavior of such traffic entities. For example, a hidden context attribute of a user may represent a state of mind of the user. The hidden context attribute (also referred to herein as "hidden context") may represent the user's intent to cross in the path of the vehicle or the user's awareness of the vehicle. In another example, a hidden context attribute may represent a goal of a user represented by the traffic entity, wherein the user expects to achieve the goal within a threshold time interval. For example, the goal may represent crossing the street to reach the other side of the street or stepping on to the street to pick up some object within the next few seconds. The system uses the hidden context attributes to predict behavior of people near a vehicle in a way that more closely resembles how human drivers would judge the behavior.

According to an embodiment, an autonomous vehicle identifies traffic entities, for example, based on the sensor data. For each traffic entity, motion parameters describing movement of the traffic entity are determined. A hidden context is determined based on a machine learning based model. The machine learning based model is trained based on feedback received from users responsive to presenting images or videos showing traffic scenarios to the users. The autonomous vehicle is navigated based on the motion parameters and the hidden context of each of the traffic entities.

The machine learning based model is turn aware, i.e., determines the hidden context based on a direction that the vehicle is planning on turning into. According to an embodiment, the system utilizes the information that the direction in which the vehicle plans to turn determines a likelihood of a pedestrian walking in front of the vehicle when the vehicle is at an intersection. A pedestrian may have high intention of crossing the street on the right sides of the vehicle. That pedestrian is not at risk of intersecting the path of the vehicle if the vehicle plans on turning left or going straight. That pedestrian is at a very high risk of intersecting the path of the vehicle, only if the vehicle is turning right. Similarly, a pedestrian may have a high intention of crossing a street in front of the vehicle (on opposite side of intersection). But that pedestrian is not at risk of getting in front of the vehicle if the vehicle is turning right or left. That pedestrian is only at high risk of intersecting the path of the vehicle if the vehicle plans on driving straight ahead. The autonomous vehicle utilizes the turn information to determine which pedestrian is at risk of getting in the path of the vehicle and which pedestrian is not likely to get in the path of the vehicle in situations where the vehicle could potentially turn, for example, at an intersection or in a parking lot.

Accordingly, the turn aware machine learning based model (or turn aware ML model) is configured to receive at least the following inputs: (1) information describing sensor data captured by an autonomous vehicle and (2) a turn direction that the vehicle is planning on turning into. The turn aware machine learning based model is configured to predict a hidden context attribute for a traffic entity for a vehicle that is planning on turning in the input turn direction.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

According to an embodiment, an autonomous vehicle receives sensor data from sensors mounted on the autonomous vehicle. Traffic entities from the traffic are identified based on the sensor data. For each of traffic entity, a hidden context is determined based on a machine learning based model. The machine learning based model is trained based on feedback received from users presented with images or videos showing traffic scenarios. The output of the machine learning based model comprises a measure of statistical distribution of the hidden context.

In one embodiment, the turn aware machine learning based model is trained as follows. The system generates stimuli comprising a plurality of video frames representing traffic entities. The stimulus comprises sample images of traffic entities near streets and/or vehicles and indicate or are measured for their understanding of how they believe the people will behave. The stimulus is modified to indicate a turn direction that a vehicle is planning on turning into. For example, the images of the stimuli may include arrows representing the turn direction. Alternatively, the stimuli may be annotated with text information describing the turn direction. The system presents the stimuli to a group of users (or human observers). These indicators or measurements are then used as a component for training a machine learning based model that predicts how people will behave in a real-world context. The machine learning based model is trained based on the reactions of human observers to sample images in a training environment. The trained machine learning based model predicts behavior of traffic entities in a real-world environment, for example, actual pedestrian behavior in traffic as a vehicle navigates through the traffic.

In an embodiment, the autonomous vehicle is navigated by generating signals for controlling the autonomous vehicle based on the motion parameters and the hidden context of each of the traffic entities. The generated signals are sent to controls of the autonomous vehicle.

The sensor data may represent images captured by cameras mounted on the autonomous vehicle or lidar scans captured by a lidar mounted on the autonomous vehicle.

Systems for predicting human interactions with vehicles are disclosed in U.S. patent application Ser. No. 15/830,549, filed on Dec. 4, 2017 which is incorporated herein by reference in its entirety. Systems for controlling autonomous vehicles based on machine learning based models are described in U.S. patent application Ser. No. 16/777,386, filed on Jan. 30, 2020, U.S. patent application Ser. No. 16/777,673, filed on Jan. 30, 2020, and U.S. patent application Ser. No. 16/709,788, filed on Jan. 30, 2020, and PCT Patent Application Number PCT/US2020/015889 filed on Jan. 30, 2020, each of which is incorporated herein by reference in its entirety.

System Environment

Figure 1:
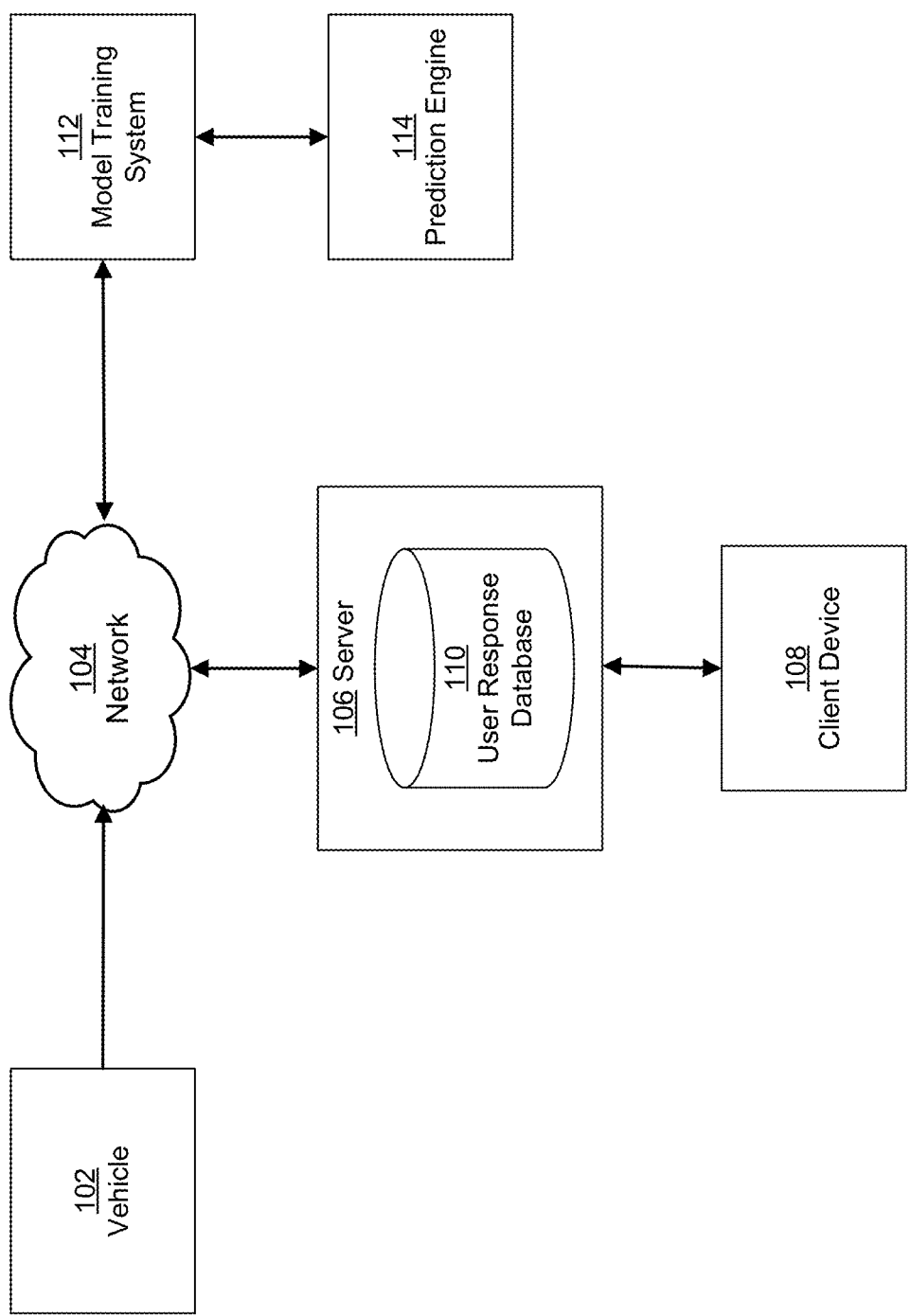
FIG. 1 is a system diagram of a networked system for predicting human behavior according to some embodiments.

FIG. 1 is a system diagram of a networked system for predicting human behavior according to some embodiments. FIG. 1 shows a vehicle 102, a network 104, a server 106, a user response database 110, a client device 108, a model training system 112 and a prediction engine 114.

The vehicle 102 can be any type of manual or motorized vehicle such as a car, bus, train, scooter, or bicycle. In an embodiment, the vehicle 102 is an autonomous vehicle. As described in more detail below, the vehicle 102 can include sensors for monitoring the environment surrounding the vehicle. In one implementation, the sensors can include a camera affixed to any portion of the vehicle for capturing a video of people near the vehicle.

The network 104 can be any wired and/or wireless network capable of receiving sensor data collected by the vehicle 102 and distributing it to the server 106, the model training system 112, and, through the model training system 112, the prediction engine 114.

The server 106 can be any type of computer system capable of (1) hosting information (such as image, video and text information) and delivering it to a user terminal (such as client device 108), (2) recording responses of multiple users (or human observers) to the information, and (3) delivering such information and accompanying responses (such as responses input via client device 108) back to the network 104.

The user response database 110 can be any type of database or data storage system capable of storing the image, video, and text information and associated user responses and subsequently recalling them in response to a query.

The model training system 112 trains a turn aware machine learning based model configured to predict hidden context attributes of traffic entities based on a turn direction of the vehicle 102, wherein the vehicle 102 is planning on turning along the turn direction within a threshold time interval, for example, within the next few seconds. The model training system 112 can be implemented in any type of computing system. In one embodiment, the system 112 receives the image, video, and/or text information and accompanying, or linked, user responses from the database 110 over the network 104. In some embodiments, the text segments are discrete values or free text responses. The model training system 112 can use images, video segments and text segments as training examples to train an algorithm, and can create labels from the accompanying user responses based on the trained algorithm. These labels indicate how the algorithm predicts the behavior of the people in the associated image, video, and/or text segments. After the labels are created, the model training system 112 can transmit them to the prediction engine 144.

In an embodiment, the turn aware machine learning based model (also referred to herein as "model") is configured to receive as input, a context specifying the turn direction of the vehicle. The context information may include the turn direction (e.g., left, straight, right) that the vehicle will be making and camera information (e.g., camera 1 coupled to the left side of the vehicle, camera 2 coupled to the right side of the vehicle) that indicates which camera of the vehicle 102 captured the image and predicts the hidden context attribute of a traffic entity, for example, determining whether a pedestrian is likely to intersect the path of the vehicle (or collide with the vehicle) when the vehicle makes a turn corresponding to the turn direction. The context transitions the model to a correct state that is aware of the upcoming turn to allow the model to predict the right information for the traffic entities. In an embodiment, the system represents the turn direction as a flag that can take one of a plurality of values, each of the plurality of values representing a possible turn direction. For example, the turn direction could be a flag that can take one of the following values: left turn (L), right turn (R), or straight (S or no turn).

The prediction engine 114 can be implemented in any computing system. In an illustrative example, the prediction engine 114 includes process that executes a turn aware machine learning based model that has been trained by the model training system 112. This process estimates a label for a new (e.g., an actual "real-world") image, video, and/or text segment based on the labels and associated image, video, and/or text segments that it received from the model training system 112. In some embodiments, this label comprises aggregate or summary information about the responses of a large number of users (or human observers) presented with similar image, video, or text segments while the algorithm was being trained.

In an embodiment, the turn aware machine learning based model is a convolutional neural network that performs multi-task learning. The turn aware machine learning based model predicts two types of information that indicates the state of mind of a traffic entity (e.g., a bicyclist): intent of traffic entity to cross in the path of the vehicle and whether the traffic entity is aware of the vehicle. The prediction describing whether a traffic entity is aware of the vehicle is independent of the direction in which the vehicle is planning on turning. The turn aware machine learning based model has a plurality of output values for the intent of traffic entity. The turn aware machine learning based model determines the hidden context for the traffic entity including an output value representing the intent of the traffic entity for each possible turn direction. The output value for a given turn direction may represent an intention of the traffic entity to move into the way of the vehicle when the vehicle makes a turn in that direction. For example, if there are three possible turn directions, the turn aware machine learning based model has three output values, one output corresponding to the input turn direction being left, another output corresponding to the input turn direction being right, and a third output corresponding to the input turn direction being no turn or continue going straight. Accordingly, in this embodiment, the turn aware machine learning based model determines the hidden context having at least four outputs, including three outputs for traffic entity intent of the user for the three turn directions and one output indicating a degree of the user's awareness of the vehicle.

In an embodiment, the autonomous vehicle has a plurality of cameras, each camera capturing images or video of a particular direction. In this embodiment, the turn aware machine learning based model has a set of outputs corresponding to each camera. Continuing with the example with three possible turn directions, the set of outputs includes four output values for each camera (e.g., three outputs for the traffic entity intent for the three directions and one output for awareness). Accordingly, the turn aware machine learning based model may have 4×N outputs is 4×N where N is the number of cameras of the vehicle that are being used to process the information. For example, if vehicle has three cameras, the model is configured to determine 4×3=12 outputs. The cameras make the turn aware machine learning based model spatially aware. Each camera is pointing in a different direction. So, if a camera that is pointing left captures a first pedestrian walking on the left side of the vehicle, the captured image/video shows that the first person is in front of the camera (although not in front of the vehicle). Similarly, if a camera that is pointing right captures a second pedestrian walking on the right side of the vehicle, the captured image/video shows that the second person is in front of the camera. Accordingly, the turn aware machine learning based model processes the video frames captured by the different cameras differently and incorporates the turn input information to make accurate prediction of the intent of the traffic entity captured by the corresponding camera.

In an embodiment, the system selects a particular output corresponding to one of the cameras depending on the turn direction of the vehicle. In another embodiment, the system determines a weighted aggregate of multiple outputs from different cameras, each output corresponding to the input turn direction. The weight assigned to each camera is determined based on a degree of correlation between the direction that the camera faces and the turn direction. For example, if a vehicle that plans to turn right includes a first camera that faces the left side, a second camera that faces straight forward, and a third camera that faces the right side, the third camera is likely to capture the best view of traffic entities to the right of the vehicle compared to the other cameras. Therefore, the weight associated with the third camera may be higher than weights associated with the first and second cameras.

In an embodiment, the system determines the turn direction based on information received from the motion planner (or the GPS planner) of the autonomous vehicle. For example, based on the planned route of the autonomous vehicle, the system determines the motion plan of the autonomous vehicle for the next few seconds. Accordingly, the system can predict the turn direction based on the motion plan. This turn direction is provided as input to the turn aware machine learning based model.

Figure 2:
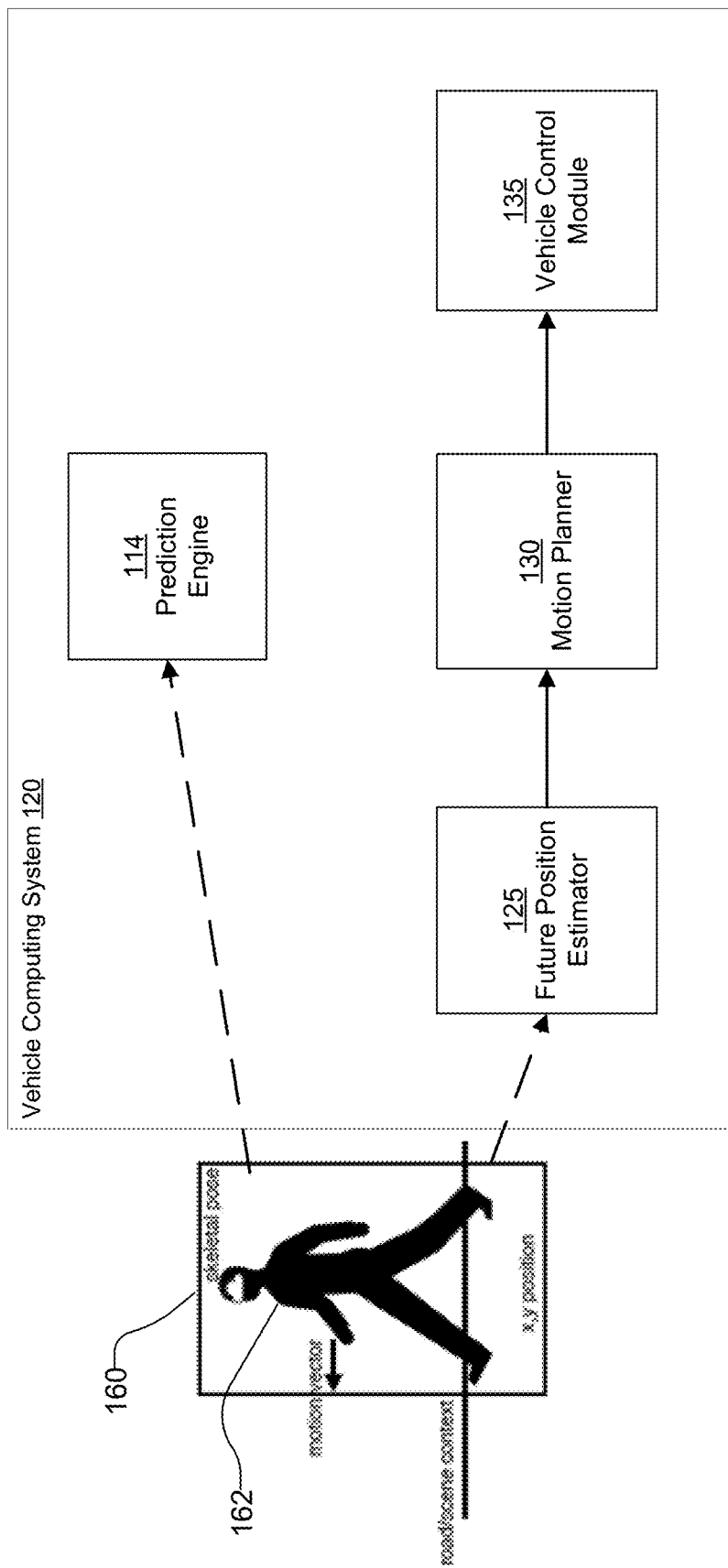
FIG. 2 is the system architecture of a vehicle computing system that navigates an autonomous vehicle based on prediction of hidden context attributes associated with traffic entities according to some embodiments.

FIG. 2 is the system architecture of a vehicle computing system that navigates an autonomous vehicle based on prediction of hidden context associated with traffic entities according to some embodiments. The vehicle computing system 120 comprises the prediction engine 114, a future position estimator 125, a motion planner 130, and a vehicle control module 135. Other embodiments may include more or fewer modules than those shown in FIG. 2. Actions performed by a particular module as indicated herein may be performed by other modules than those indicated herein.

The sensors of an autonomous vehicle capture sensor data 160 representing a scene describing the traffic surrounding the autonomous vehicle. Examples of sensors used by an autonomous vehicle include cameras, lidars, GNSS (global navigation satellite system such as a global positioning system, or GPS), IMU (inertial measurement unit), and so on. Examples of sensor data includes camera images and lidar scans.

The traffic includes one or more traffic entities, for example, a pedestrian 162. The vehicle computing system 120 analyzes the sensor data 160 and identifies various traffic entities in the scene, for example, pedestrians, bicyclists, other vehicles, and so on. The vehicle computing system 120 determines various parameters associated with the traffic entity, for example, the location (represented as x and y coordinates), a motion vector describing the movement of the traffic entity, and so on. For example, a vehicle computing system 120 may collect data of a person's current and past movements, determine a motion vector of the person at a current time based on these movements, and extrapolate a future motion vector representing the person's predicted motion at a future time based on the current motion vector.

The future position estimator 125 estimates the future position of a traffic entity. The motion planner 130 determines a plan for the motion of the autonomous vehicle. The vehicle control module 135 sends signals to the vehicle controls (for example, accelerator, brakes, steering, emergency braking system, and so on) to control the movement of the autonomous vehicle. In an embodiment, the future position estimates for a traffic entity determined by the future position estimator 125 based on sensor data 160 are provided as input to the motion planner 130. The motion planner 130 determines a plan for navigating the autonomous vehicle through traffic, and provides a description of the plan to the vehicle control module 135. The vehicle control module 135 generates signals for providing to the vehicle controls. For example, the vehicle control module 135 may send control signals to an emergency braking system to stop the vehicle suddenly while driving, the vehicle control module 135 may send control signals to the accelerator to increase or decrease the speed of the vehicle, or the vehicle control module 135 may send control signals to the steering of the autonomous vehicle to change the direction in which the autonomous vehicle is moving.

Figure 3:
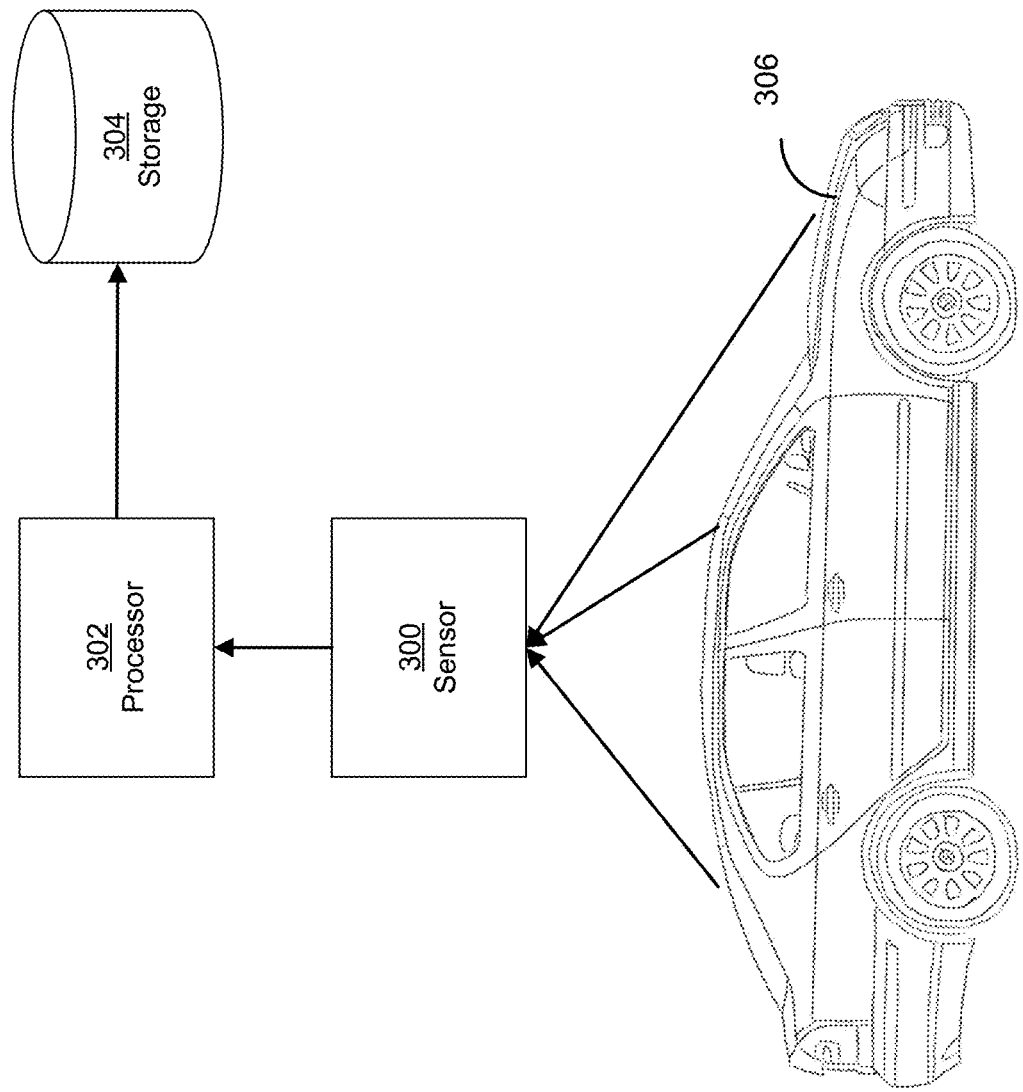
FIG. 3 is a system diagram showing a sensor system associated with a vehicle, according to some embodiments.

FIG. 3 is a system diagram showing a sensor system associated with a vehicle, according to some embodiments. FIG. 3 shows a vehicle 306 with arrows pointing to the locations of its sensors 300, a local processor and storage 302, and remote storage 304.

Data is collected from cameras or other sensors 300 including solid state Lidar, rotating Lidar, medium range radar, or others mounted on the car in either a fixed or temporary capacity and oriented such that they capture images of the road ahead, behind, and/or to the side of the car. In some embodiments, the sensor data is recorded on a physical storage medium (not shown) such as a compact flash drive, hard drive, solid state drive or dedicated data logger. In some embodiments, the sensors 300 and storage media are managed by the processor 302.

The sensor data can be transferred from the in-car data storage medium and processor 302 to another storage medium 304 which could include cloud-based, desktop, or hosted server storage products. In some embodiments, the sensor data can be stored as video, video segments, or video frames.

In some embodiments, data in the remote storage 304 also includes database tables associated with the sensor data. When sensor data is received, a row can be added to a database table that records information about the sensor data that was recorded, including where it was recorded, by whom, on what date, how long the segment is, where the physical files can be found either on the internet or on local storage, what the resolution of the sensor data is, what type of sensor it was recorded on, the position of the sensor, and other characteristics.

Figure 4:
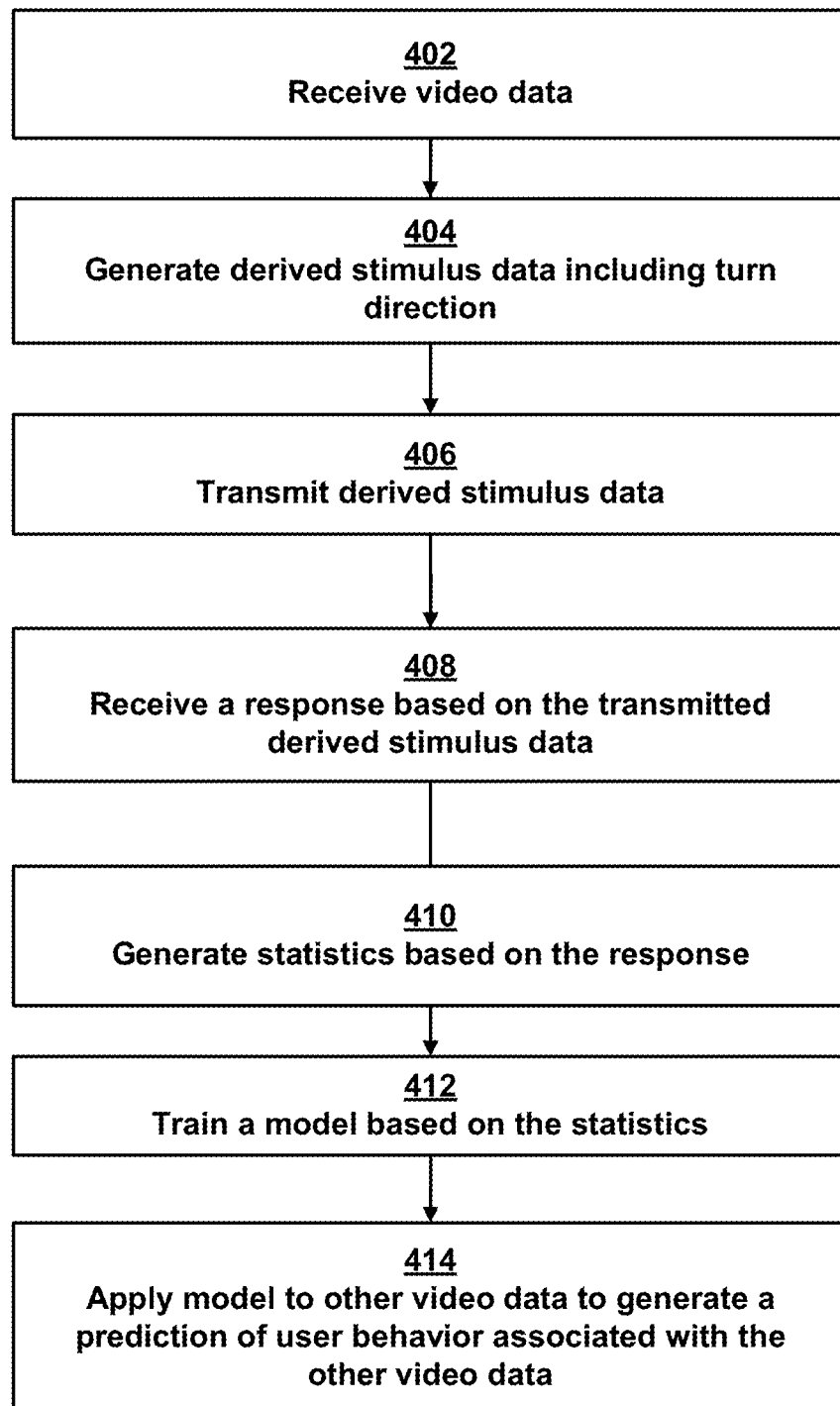
FIG. 4 is a flowchart showing a process of training a machine learning based model to predict hidden context information describing traffic entities, according to some embodiments.

FIG. 4 is a flowchart showing a process of training a machine learning based model to predict hidden context information describing traffic entities, according to some embodiments. In one implementation, video or other data is captured by a camera or sensor mounted on the vehicle 102. The camera or other sensor can be mounted in a fixed or temporary manner to the vehicle 102. The camera does not need to be mounted to an automobile, and could be mounted to another type of vehicle, such as a bicycle. As the vehicle travels along various streets, the camera or sensor captures still and/or moving images (or other sensor data) of pedestrians, bicycles, automobiles, etc. moving or being stationary on or near the streets. In step 402, this video or other data captured by the camera or other sensor is transmitted from the vehicle 102, over the network 104, and to the server 106 where it is stored.

Figure 5A:
FIGS. 5A, 5B, 5C illustrate user interfaces that modify a stimulus to include information describing a turn direction in which the vehicle plans on turning, according to some embodiments.
Figure 5B:
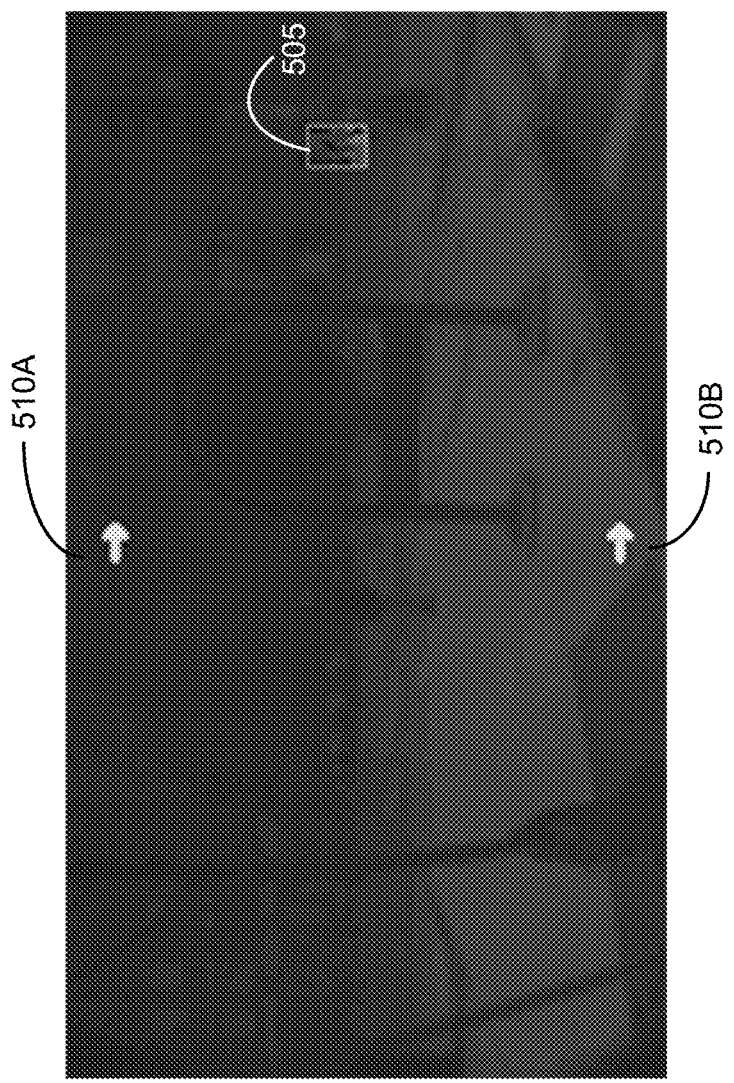
Figure 5C:
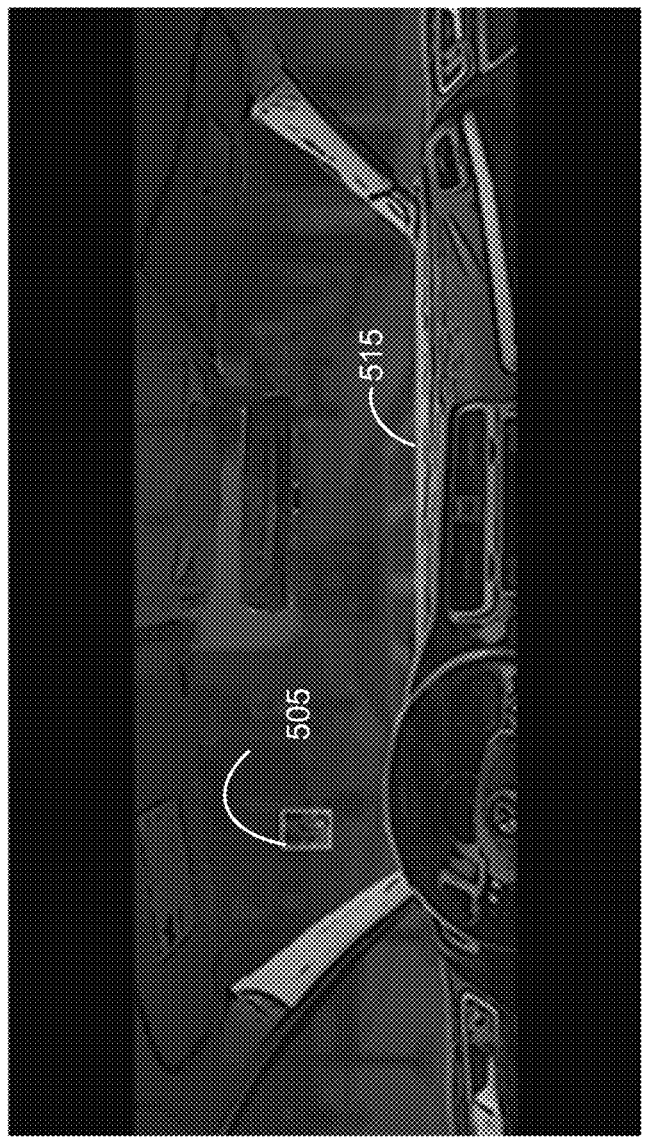

Then, in step 404, video frames or segments are extracted from the stored video or other data and are used to create stimulus data including derived stimulus (or stimuli). In one implementation, the derived stimulus corresponds to a scene in which one or more humans are conducting activities (e.g., standing, walking, driving, riding a bicycle, etc.) beside or on a street and/or near a vehicle. In an embodiment, the stimulus is modified to include information describing a turn direction in which a vehicle is expected to turn within a short time interval, for example, within the next few seconds. FIGS. 5A, 5B, 5C illustrate various embodiments for modifying a stimulus to include information describing the turn direction.

The stimuli are presented to users that act as annotators via a user interface. The user interface is configured to present an image of the traffic annotated with information describing the direction the vehicle is turning into or planning on turning into. The user interface also presents the annotators with a question based on the traffic entity in focus (e.g., how likely if this person, to cross in front of the vehicle, given a direction in which the vehicle is turning).

As explained in more detail below for example in step 406, as part of the training process for the prediction algorithm, human observers view the derived stimulus and predict how they believe the humans shown in the derived stimulus will act. In yet a further implementation, after the video frames or segments are extracted from the stored data, the derived stimulus is generated by manipulating the pixels or equivalent array data acquired from the camera or other sensor in step 414, producing a new data file that conveys a portion of the information from the original video with certain aspects highlighted or obscured.

In step 406, the derived stimulus is transmitted from the server 106 and displayed to a large number of users (or human observers) on the client device 108 (or multiple client devices 108). The client devices(s) 108 prompt the human observers to predict how the people shown in the derived stimulus will act, and upon viewing the displayed stimulus, the observers input their responses corresponding to their predictions. For example, the human observers may predict that a bicyclist will continue riding, whether a first person in the stimulus will cross the street, whether another person will remain standing on a street corner, and yet another person will change lanes on his or her bicycle. In an illustrative embodiment, the human observers may make a continuous or ordinal judgment about the state of mind or the predicted behavior of the people shown in the derived stimulus and record that judgment. For example, the human observers may select an appropriate icon displayed on the client devices(s) 108 by clicking a mouse or by pressing a key to indicate their judgment or prediction. The judgment or prediction may correspond to the human observers' assessment of the state of mind of the person in the derived stimulus or other awareness or intention that would be relevant to a hypothetical driver who sees the person in the derived stimulus while driving. In step 408, the derived stimulus and associated human observer responses are transmitted from the client device(s) 108 to the server 106 and recorded in the user response database 110.

In step 410, summary statistics are generated based on the user responses. For example, the statistics may characterize the aggregate responses of multiple human observers to a particular derived stimulus. For instance, if the derived stimulus shows a pedestrian walking on a sidewalk towards an intersection, the response can be categorized in terms of how many human observers believe that the pedestrian will stop upon reaching the intersection, continue walking straight across the intersection, turn a corner and continue walking along the sidewalk without crossing the intersection, etc. These summary statistics can characterize the human observer responses in terms of certain parameters associated with the statistics, such as a content of a response, a time associated with entering a response, and a position of an eye of a human observer associated with the response. The parameters can also be associated with a (1) central tendency, variance, skew, kurtosis, scale, or histogram. For example, the amount of time users took to input their responses can be characterized in terms of central tendency, variance, skew, kurtosis, scale, histogram. Also, the statistics can include a parameter that additionally or alternatively characterizes the movement of the human observers' eyes relative to a display when making the judgments in terms of central tendency, variance, skew, kurtosis, scale, histogram or two-dimensional distribution. In one embodiment, the statistics are stored in the user response database 110 with an index that identifies the raw video or sensor data from which the derived stimulus was generated. In a further embodiment, the statistics stored in the database 110 cover a large set of images of people on or near roads and are categorized in a number of different categories, such as pedestrian, driver, motorcyclist, bicyclist, scooter driver, self-balancing scooter rider, unicyclist, motorized wheelchair user, skateboarder, or others. Moreover, the statistics are respectively stored along with, or linked to, the images of the derived stimuli corresponding to the statistics.

In step 412, the stored statistics and corresponding images (e.g., the video frames or segments that were extracted from the video or other data (captured from the camera or sensor of the vehicle 202)) are sent over the network 104 to the model training system 112 and used to train a prediction algorithm. For example, the collection of images and statistics can be used to train a supervised learning algorithm, which can comprise a random forest regressor, a support vector regressor, a simple neural network, a deep convolutional neural network, a recurrent neural network, a long-short-term memory (LSTM) neural network with linear or nonlinear kernels that are two dimensional or three dimensional, or any other supervised learning algorithm which is able to take a collection of data labeled with continuous values and adapt its architecture in terms of weights, structure or other characteristics to minimize the deviation between its predicted label on a novel stimulus and the actual label collected on that stimulus using the same method as was used on the set of stimuli used to train that network. The model is given data which comprises some subset of the pixel data from the video frames that the summary statistics were generated from. In one implementation, this subset includes the pixel data contained in a bounding box drawn to contain the boundaries of the person, cyclist, motorist and vehicle, or other road user, including their mode of conveyance. In some other implementations, it also includes the entire pixel data from the rest of the image. In one of those implementations, that pixel data is selected according to criteria such as the salience of those features in terms of contrast, lighting, presence of edges, or color. In an additional implementation, the features can include descriptive meta-data about the images such as the dimensions and location of the bounding box, the shape of the bounding box or the change in size or position of the bounding box from one frame to the next.

In step 414, the prediction engine 114 uses the trained model from the model training system 112 to predict the actual, "real-world" or "live data" behavior of people on or near a road. In one embodiment, the prediction engine 114 receives "live data" that matches the format of the data used to train the trained model. For example, if the trained model was trained based on video data received from a camera on the vehicle 102, the "live data" that is input to the algorithm likewise is video data from the same or similar type camera. On the other hand, if the model was trained based on another type of sensor data received from another type of sensor on the vehicle 102, the "live data" that is input to the prediction engine 114 likewise is the other type of data from the same or similar sensor.

The trained model or algorithm makes a prediction of what a pedestrian or other person shown in the "live data" would do based on the summary statistics and/or training labels of one or more derived stimulus. The accuracy of the model is determined by having it make predictions of novel derived stimuli that were not part of the training images previously mentioned but which do have human ratings attached to them, such that the summary statistics on the novel images can be generated using the same method as was used to generate the summary statistics for the training data, but where the correlation between summary statistics and image data was not part of the model training process. The predictions produced by the trained model comprise a set of predictions of the state of mind of road users that can then be used to improve the performance of autonomous vehicles, robots, virtual agents, trucks, bicycles, or other systems that operate on roadways by allowing them to make judgments about the future behavior of road users based on their state of mind.

The server 106 generates derived stimuli from raw camera or sensor data of the vehicle for presenting to human observers. As described above, sensor data can include video segments or specific frames. These frames can either be contiguous or non-contiguous, and can be in the original order, in a permuted order, in reverse order, or in random order. Some of the frames can be repeated once or more than once.

Some of the frames may be manipulated. The frames can be manipulated by adjusting pixel values. These manipulations can include blurring, the addition or one or more occluding bars, bands, or shapes, sharpening, the removal of color information, the manipulation of color information, the drawing of non-occluding or highlighting shapes on the image, other manipulations, or a combination of the manipulations listed here, or a combination of the manipulations listed here with other manipulations, or other manipulations of the pixels not listed combined with each other. The manipulations serve the purpose of highlighting, occluding or degrading portions of the image, so that when the images are shown to the human observers, they are directed to people or specific portions of the image when predicting what the people in the images will do. For example, using the highlighting described above, a certain pedestrian in a scene can be isolated such that a human observer's feedback can be more reliably associated with the pedestrian. Frames may be recombined to form a derived stimulus. In some embodiments, if there is only one frame, that frame comprises the derived stimulus. If there is more than one frame those frames may then be recombined.

Predictions and other information is collected from human observers based on derived stimuli. Human observers are given detailed instructions about how to answer questions about derived stimuli. Those observers are presented with derived stimuli and asked to answer questions about them. The observers respond to the stimuli and those responses are recorded. The recorded responses are aggregated and logged in a database, for example, the user response database 110.

Human observers are recruited to participate on one or several crowdsourcing websites, such as Amazon's Mechanical Turk or at a physical location provided with a display. The observers are given detailed written and pictorial instructions explaining the task that they are about to complete. These instructions give examples of situations that might be depicted in the derived stimuli, and the kinds of responses that would be appropriate for those situations. For example, if human observers are asked to judge the intention of a pedestrian to walk in front of a car, the instructions may be: "In this test, we want you to pretend you're driving a car. You'll see road scenes with cyclists highlighted, and you'll have to decide what they're planning to do. Try to answer as quickly as you can."

The human observers may be shown a display which includes the derived stimulus. The display also includes a mechanism for making a judgment about the stimulus. The mechanism for making the judgment can be a continuous indicator such as a ribbon on which the observer could drag a control to a certain point. The mechanism can also be an ordinal measure such as a Likert scale where the observer can make a judgment about a degree of certainty of the judgment. The mechanism can also be a control that the human observer drags with their mouse to draw a trajectory onscreen indicating a judgment. The mechanism can also be a text entry field where the observer types a description of their judgment.

The judgment that the human observer makes is a hidden context attribute that may represent an evaluation of the state of mind of a road user depicted in the derived stimulus. The evaluation can be of the intention, awareness, personality, state of consciousness, level of tiredness, aggressiveness, enthusiasm, thoughtfulness or another characteristic of the internal mental state of the pictured road user. If the ratings collected are on an ordinal scale they can describe the characteristic using language of probability, such as "the other driver may be attentive" or "the other driver" is definitely attentive" or "the other driver is definitely not attentive".

The ratings of large numbers of human observers are collected. Summary statistics are generated based on the responses of all of the observers who looked at an image. Individual variability in responses to a given stimulus can be characterized in the information given by the observers to the learning algorithm. The summary statistics might include unweighted information from all observers, or might exclude observers based on extrinsic or intrinsic criteria such as the time it took an observer to respond, the geographical location of an observer, the observer's self-reported driving experience, or the observer's reliability in making ratings of a set of other images.

The explicit response of the observer is recorded as well as implicit data. The implicit data can include how long the subject took to respond, if they hesitated in their motions, if they deleted keystrokes, if they moved the mouse anywhere other than the location corresponding to the response they eventually chose, where their eyes moved, or other implicit measures.

The responses are aggregated and recorded in a data structure, such as the user response database 110. This data structure is then sent as a text field to a networked computer system running database software and logged in a database.

Figure 6:
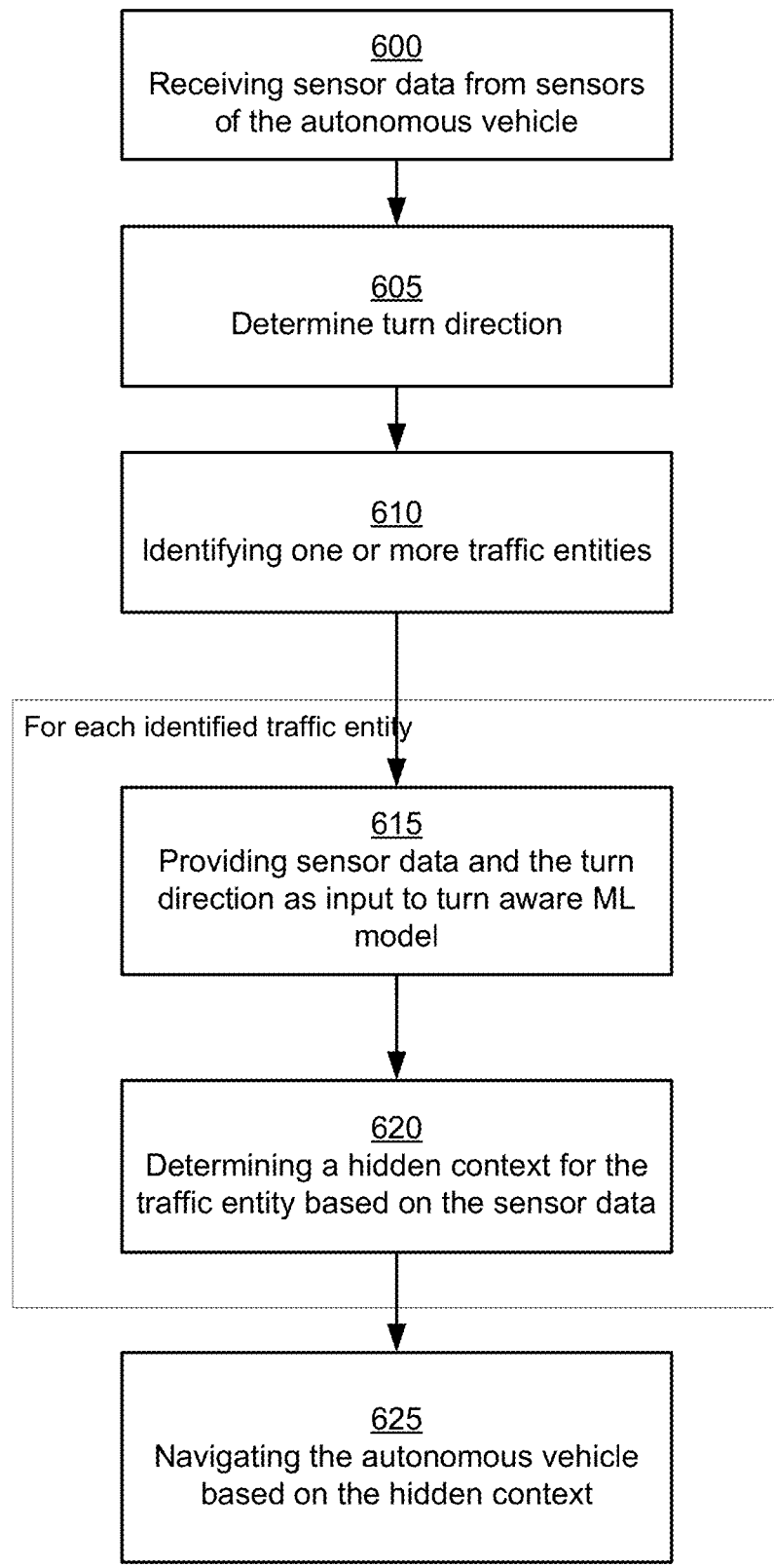
FIG. 6 is a flowchart showing a process of predicting hidden context attributes of traffic entities using a trained learning algorithm, according to some embodiments.

For each stimulus rated by each human observer, a response is recorded that could be a continuous, discrete, or ordinal value. This value may refer to the probability of the pictured human road user has a given state of mind—e.g. that a pedestrian is likely to cross the street or that an oncoming vehicle is unlikely to be willing to yield to the vehicle containing the sensor if the vehicle containing the sensor needs to turn. In some embodiments, a higher ordinal value (e.g., the ordinal 4 as shown in FIG. 6) indicates that a human observer believes that there is a higher probability that the pictured human road user has a given state of mind or will perform a particular action. On the other hand, a lower ordinal value (e.g., the ordinal 1) indicates that the human observer believes that there is a lower probability that the pictured human road user has the state of mind or will perform the particular action. On the other hand, in some embodiments, a lower ordinal value can indicate a higher probability of an action, and a higher ordinal value can indicate a lower probability of an action.

An amount of time associated with a subject responding to the derived stimulus may also be recorded. In some embodiments, this time is associated with the overall reliability of the human observer's rating. For example, a response associated with a lower response time may be weighted higher and a response associated with a slower response time may be weighted lower.

Summary statistics of a video frame or derived stimulus is generated. These summary statistics could include measurements of the central tendency of the distribution of scores like the mean, median, or mode. They could include measurements of the heterogeneity of the scores like variance, standard deviation, skew, kurtosis, heteroskedasticity, multimodality, or uniformness. They could also include summary statistics like those above calculated from the implicit measurements of the responses listed above. The calculated summary statistics are linked to the video frame or sensor data frame associated with the responses from which they were calculated.

The summary statistics is used for training machine learning based models. The machine learning based model may be any type of supervised learning algorithm capable of predicting a continuous label for a two or three dimensional input, including but not limited to a random forest regressor, a support vector regressor, a simple neural network, a deep convolutional neural network, a recurrent neural network, a long-short-term memory (LSTM) neural network with linear or nonlinear kernels that are two dimensional or three dimensional.

In one embodiment of the model training system 112, the machine learning based model can be a deep neural network. In this embodiment the parameters are the weights attached to the connections between the artificial neurons comprising the network. Pixel data from an image in a training set collated with human observer summary statistics serves as an input to the network. This input can be transformed according to a mathematical function by each of the artificial neurons, and then the transformed information can be transmitted from that artificial neuron to other artificial neurons in the neural network. The transmission between the first artificial neuron and the subsequent neurons can be modified by the weight parameters discussed above. In this embodiment, the neural network can be organized hierarchically such that the value of each input pixel can be transformed by independent layers (e.g., 10 to 20 layers) of artificial neurons, where the inputs for neurons at a given layer come from the previous layer, and all of the outputs for a neuron (and their associated weight parameters) go to the subsequent layer. At the end of the sequence of layers, in this embodiment, the network can produce numbers that are intended to match the human summary statistics given at the input. The difference between the numbers that the network output and the human summary statistics provided at the input comprises an error signal. An algorithm (e.g., back-propagation) can be used to assign a small portion of the responsibility for the error to each of the weight parameters in the network. The weight parameters can then be adjusted such that their estimated contribution to the overall error is reduced. This process can be repeated for each image (or for each combination of pixel data and human observer summary statistics) in the training set. At the end of this process the model is "trained", which in some embodiments, means that the difference between the summary statistics output by the neural network and the summary statistics calculated from the responses of the human observers is minimized.

FIGS. 5A, 5B, 5C illustrate user interfaces that modify a stimulus to include information describing a turn direction in which the vehicle plans on turning, according to some embodiments. Each of FIGS. 5A, 5B, and 5C shows a screenshot of a user interface or an image displaying a traffic entity that may be presented to a subject user with a question regarding a traffic entity. For example, the traffic entity may be a pedestrian and the question may request the subject user to select an option representing a likelihood of the pedestrian getting in the path of the vehicle from which the image was captured.

FIG. 5A shows a basic stimulus according to an embodiment. In an embodiment, the basic stimulus includes a plurality of frames, for example, three frames or four frames. One or more frame may highlight a target traffic entity, for example, a pedestrian or cyclist. The highlighting may be performed by displaying a bright colored bounding box around the traffic entity, for example, a rectangle around the traffic entity 505. In addition, or in the alternative, the rest of the image may be greyed out or blurred out to direct the subject user's attention towards the target. FIG. 5A shows an example of the 'basic' stimulus.

In an embodiment, the basic stimulus illustrated in FIG. 5A is modified or extended with turn direction information before presenting to the subject user. FIG. 5B shows a modified stimulus with arrows 510a and 510b drawn on the top and bottom respectively of the stimulus that point in the direction the vehicle is turning. Though the turn direction is extracted from continuous and future vehicle wheel angle data, it is currently discretized into one of three directions: left, right and straight-ahead. In some embodiments, information is provided describing any possible direction, for example, by making the arrows 510 point at an arbitrary direction (not necessarily left, right, or straight-ahead) indicating of the direction the vehicle is planning on turning into. The direction indicated by the arrow 510 may be a direction different from the direction that the vehicle actually took since the data is being used as training data. In some embodiments, the same stimulus may be presented with multiple turn directions to generate additional training data. In either case, the arrows 510 allow subjects to modify their judgments of whether the target intends to cross in front of the vehicle by giving them back information about where the region "in front" of the vehicle is and will ultimately be that they would have if they were actually at the wheel.

In some embodiments, the modified stimulus extends the basic stimulus by zooming-into the pedestrian bounding box region within a basic stimulus. This magnifies the target, allowing subjects to make judgments about small, distant targets with a degree of perceptual parity to closer, larger targets.

FIG. 5C shows a modified stimulus overlaid with a frame 515 representing an interior of a vehicle as seen from a driver's perspective. The visible portions of the stimulus are shown through the windshield and side windows of the vehicle to simulate how the driver would view the surrounding environment from inside of the vehicle. The modified stimulus creates an immersive experience and allows the subjects to make judgments as if they were at the wheel. The stimulus illustrated in FIG. 5C is a subsequent frame of the stimulus illustrated in FIG. 5B. By presenting the traffic entity 505 across multiple frames, the subject user that is evaluating the state of mind of the traffic entity 505 can better predict where the traffic entity 505 is headed and what the goal of the traffic entity 505 is.

Figure 5D:
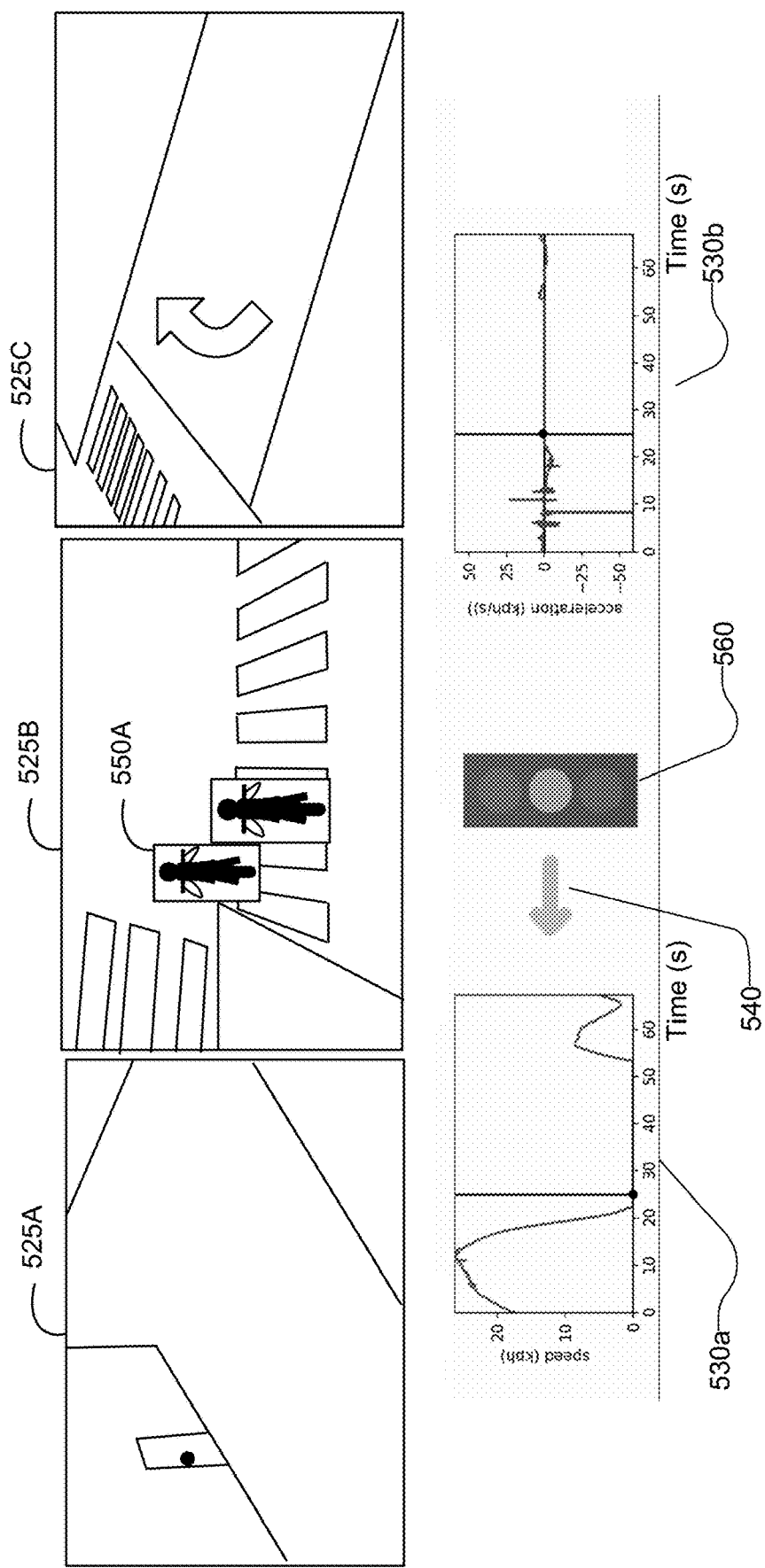
FIGS. 5D and 5E illustrate a user interface showing images captured by three cameras as the vehicle drives through traffic, according to some embodiments.
Figure 5E:
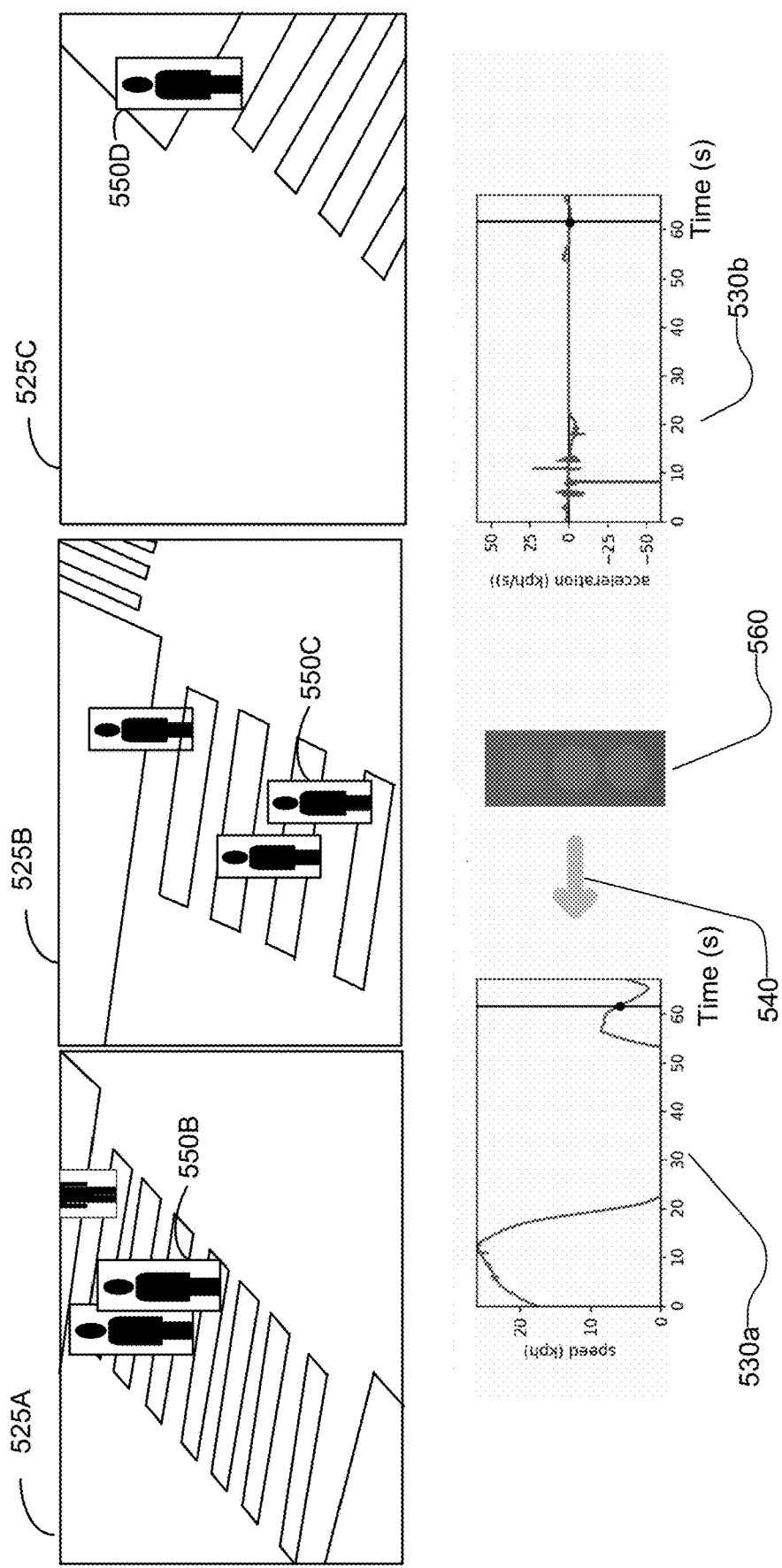

FIGS. 5D and 5E illustrate a user interface showing images captured by three cameras as the vehicle drives through traffic, according to an embodiment. The three cameras capture images of the surrounding environment from different angles. For example, a first camera captures images of the left side of the vehicle, a second camera captures images in front of the vehicle, and a third camera captures images of the right side of the vehicle. The first camera captures the first image 525a, the second camera captures the second image 525b, and the third camera captures the third image 525c. The images 525 are modified to show bounding boxes 550 around traffic entities such as pedestrians and other motorists. The user interface shows the direction in which the vehicle is planning on turning using an arrow 540. The user interface also shows the action recommended by the model using a widget 560, for example, based on a navigation action table that recommends an action that the vehicle should take based on the model output. That is, the widget 560 is based on the output of the model when the images 525 and a turn direction represented by the arrow 540 are provided as input. The user interface shows other metrics such as speed 530a and acceleration 530b to provide additional context on the vehicle's movement at a time at which the images 525 were captured. For example, at a time at which the images 525 were captured (e.g., corresponding to time=25 s), the speed of the vehicle is at 0 kph and the acceleration of the vehicle is at 0 kph/s. The user interface shown in FIGS. 5D-E may be shown by a tool for illustrating how the ML model is performing or for debugging/testing issues related to the ML model or operation of the autonomous vehicle. FIGS. 5D and 5E shows the user interface at two time-points as the autonomous vehicle drives.

In FIG. 5D, the user interface includes images 525 captured at a first time point as a vehicle approaches an intersection to make a left turn as indicated by the arrow 540.

The second image 525b includes bounding boxes 550a around two motorcyclists and a pedestrian ahead of the vehicle. The widget 560 presents a recommended action for the driver using a traffic light. In the illustrated example, the yellow light of the traffic light is highlighted to represent the recommended action of approaching the intersection carefully and prepare to stop. The recommended action is determined based on an output provided by the model in response to the images 525 being input to the model. The bounding boxes 550a around the motorcyclists may also be yellow since the motorcyclists are not immediately in the way of the vehicle, but need to be monitored since they could be in the way when the vehicle makes the left turn. However, the bounding box 550a around the pedestrian is green because the pedestrian is located far from the vehicle and unlikely to have intent to cross in front of the vehicle.

In FIG. 5E, the user interface includes images captured at a second time point subsequent to the first time point as the vehicle enters the intersection to make the left turn. In the first image 525a and the second image 525b, pedestrians that are crossing the crosswalk are highlighted with bounding boxes 550b and 550c. Since the likelihood of these pedestrians being in the way of the vehicle that plans to turn left is greater than a predetermined threshold, the bounding boxes 550b and 550c are highlighted in red. In contrast, the pedestrian in the third camera output 525c to the right of the vehicle is highlighted in green since the vehicle is turning left and will not encounter this pedestrian. In FIG. 5E, the red light of the traffic light in the widget 560 is highlighted to indicate that the model recommend that the vehicle stop turning left since the state of mind of the pedestrians indicate that it is highly likely that the pedestrians will cross in the way of the vehicle when the vehicle continues to turn left. The speed of the vehicle at a time at which the images 525 are captured (e.g., at around 62 s) is around 5 kph, and the acceleration is around −2 kph/s.

In some embodiments, FIGS. 5D-5E may be presented to users and used to evaluate how the ML model is performing. For example, the interfaces illustrated in FIGS. 5D-5E may be presented to subject users along with questions such as "Do you agree with the recommended action in the presented stimulus? If not, what is the action that the driver should take instead?" Based on the responses, the model may be further trained. Alternatively, the system asks the annotators to recommend a driving action to take if they were driving the vehicle. The system compares the user's recommendation with the driving action predicted by the system.

Navigating Autonomous Vehicle Based on Hidden Context

The vehicle computing system 120 predicts hidden context representing intentions and future plans of a traffic entity (e.g., a pedestrian or a bicyclist). The hidden context may represent a state of mind of a person represented by the traffic entity. For example, the hidden context may represent a near term goal of the person represented by the traffic entity, for example, indicating that the person is likely to cross the street, or indicating that the person is likely to pick up an object (e.g., a wallet) dropped on the street but stay on that side of the street, or any other task that the person is likely to perform within a threshold time interval. The hidden context may represent a degree of awareness of the person about the autonomous vehicle, for example, whether a bicyclist driving in front of the autonomous vehicle is likely to be aware that the autonomous vehicle is behind the bicycle.

The hidden context may be used for navigating the autonomous vehicle, for example, by adjusting the path planning of the autonomous vehicle based on the hidden context. The vehicle computing system 120 may improve the path planning by taking a machine learning based model that predicts the hidden context representing a level of human uncertainty about the future actions of pedestrians and cyclists and uses that as an input into the autonomous vehicle's motion planner. The training dataset of the machine learning models includes information about the ground truth of the world obtained from one or more computer vision models. The vehicle computing system 120 may use the output of the prediction engine 114 to generate a probabilistic map of the risk of encountering an obstacle given different possible motion vectors at the next time step. Alternatively, the vehicle computing system 120 may use the output of the prediction engine 114 to determine a motion plan which incorporates the probabilistic uncertainty of the human assessment.

In an embodiment, the prediction engine 114 determines a metric representing a degree of uncertainty in human assessment of the near-term goal of a pedestrian or any user representing a traffic entity. The specific form of the representation of uncertainty is a model output that is in the form of a probability distribution, capturing the expected distributional characteristics of user responses of the hidden context of traffic entities responsive to the users being presented with videos/images representing traffic situations. The model output may comprise summary statistics of hidden context, i.e., the central tendency representing the mean likelihood that a person will act in a certain way and one or more parameters including the variance, kurtosis, skew, heteroskedasticity, and multimodality of the predicted human distribution. These summary statistics represent information about the level of human uncertainty.

In an embodiment, the vehicle computing system 120 represents the hidden context as a vector of values, each value representing a parameter, for example, a likelihood that a person represented by a traffic entity is going to cross the street in front of the autonomous vehicle, a degree of awareness of the presence of autonomous vehicle in the mind of a person represented by a traffic entity, and so on.

Overall Process of Navigating an Autonomous Vehicle Through Traffic

FIG. 6 represents a flowchart illustrating the process of navigating the autonomous vehicle based on hidden context, according to an embodiment. The steps illustrated in the flowchart may be performed in an order different from that illustrated in FIG. 6. For example, certain steps may be performed in parallel. The steps may be performed by modules other than those indicated herein.

The vehicle computing system 120 receives 600 sensor data from sensors of the autonomous vehicle. For example, the vehicle computing system 120 may receive lidar scans from lidars and camera images from cameras mounted on the autonomous vehicle. If there are multiple cameras mounted on the vehicle, the vehicle computing system 120 receives videos or images captured by each of the cameras. In an embodiment, the vehicle computing system 120 builds a point cloud representation of the surroundings of the autonomous vehicle based on the sensor data. The point cloud representation includes coordinates of points surrounding the vehicle, for example, three dimensional points and parameters describing each point, for example, the color, intensity, and so on.

The autonomous vehicle determines 605 a turn direction, for example, based on the motion plan generated by the motion planner. The turn direction indicates the direction in which the vehicle plans on turning within a short time interval, for example, a time interval of next few seconds.

The vehicle computing system 120 identifies 610 one or more traffic entities based on the sensor data, for example, pedestrians, bicyclists, or other vehicles driving in the traffic. The traffic entities represent non-stationary objects in the surroundings of the autonomous vehicle.

In an embodiment, the autonomous vehicle obtains a map of the region through which the autonomous vehicle is driving. The autonomous vehicle may obtain the map from a server. The map may include a point cloud representation of the region around the autonomous vehicle. The autonomous vehicle performs localization to determine the location of the autonomous vehicle in the map and accordingly determines the stationary objects in the point cloud surrounding the autonomous vehicle. The autonomous vehicle may superimpose representations of traffic entities on the point cloud representation generated.

The vehicle computing system 120 repeats the following steps 615 and 620 for each identified traffic entity. The vehicle computing system 120 determines 615 provides the sensor data and the turn direction as input to the turn aware ML model and executes the turn aware ML model. The vehicle computing system 120 determines 620 a hidden context associated with the traffic entity using the turn aware ML model, for example, the intent of a pedestrian.

The vehicle computing system 120 navigates 625 the autonomous vehicle based on the hidden context. For example, the vehicle computing system 120 may determine a safe distance from the traffic entity that the autonomous vehicle should maintain based on the predicted intent of the traffic entity. If the turn aware ML model is configured to output multiple values, each corresponding to a turn direction, the vehicle computing system 120 uses the output corresponding to the turn direction of the vehicle. If the turn aware ML model is configured to output multiple values, each corresponding to a turn direction and a camera, the vehicle computing system 120 can select any camera, e.g. the camera facing the direction that is closest to the turn direction, and uses the output corresponding to the turn direction of the vehicle for the selected camera.

Computing Machine Architecture

Figure 7:
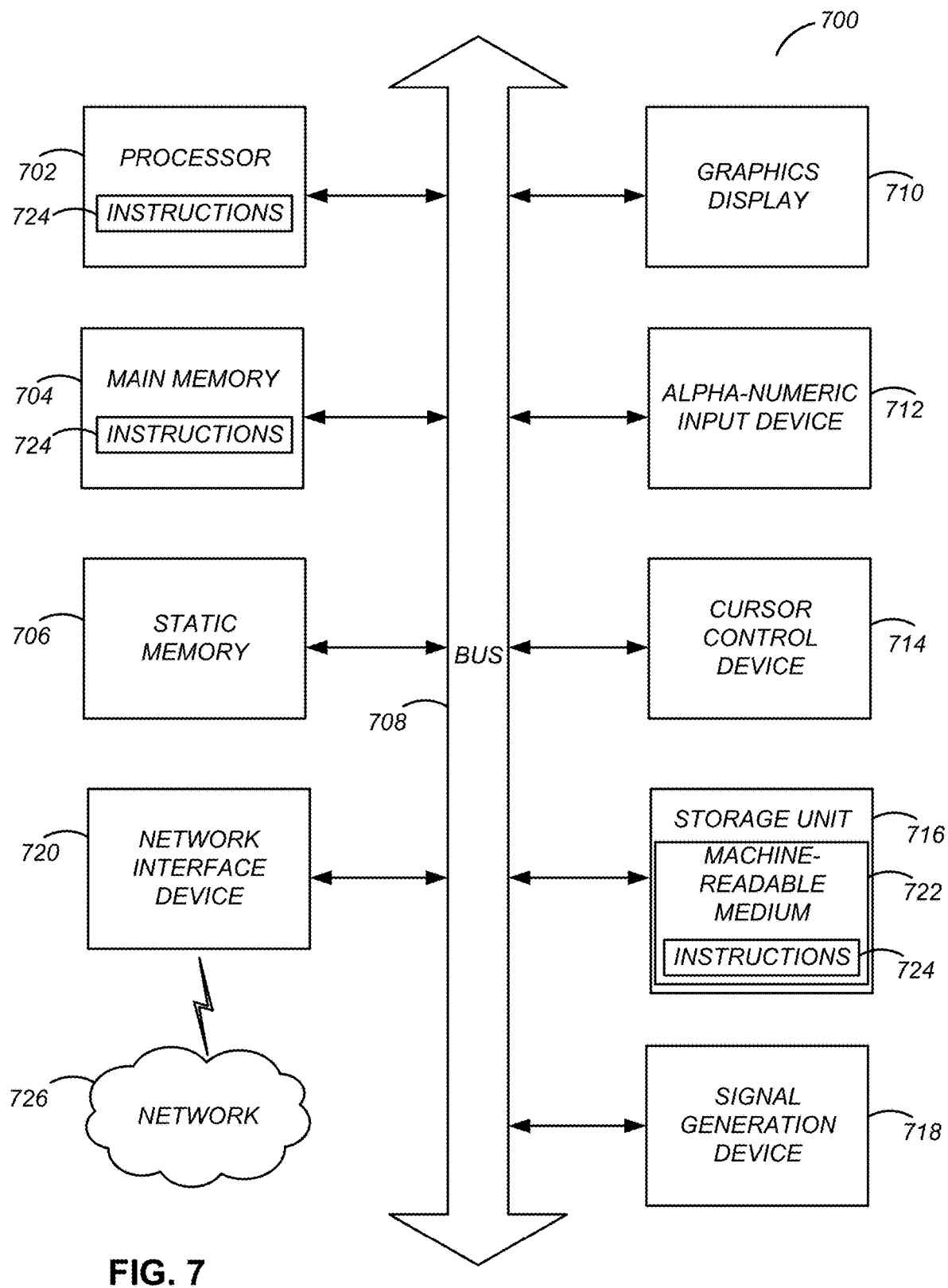
FIG. 7 is a block diagram illustrating components of an example machine able to read instructions from a machine-readable medium and execute them in a processor (or controller), according to some embodiments.

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Although embodiments disclosed describe techniques for navigating autonomous vehicles, the techniques disclosed are applicable to any mobile apparatus, for example, a robot, a delivery vehicle, a drone, and so on.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device) or in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method comprising:
   receiving images captured by a plurality of cameras of an autonomous vehicle, the images displaying a traffic entity;
   determining an expected turn direction that the autonomous vehicle is planning on following within a threshold time interval;
   accessing a machine learning based model trained using training data including stimuli comprising traffic entities presented to a plurality of users and user responses received from the plurality of users, the user responses describing hidden context attributes of the traffic entities in the stimuli;
   providing the received images as input to the machine learning based model to determine an output for each of the plurality of cameras of the autonomous vehicle;
   determining a hidden context attribute of the traffic entity displayed in the received images as a weighted aggregate of the outputs determined for each of the plurality of cameras, wherein a weight of a camera is determined based on a degree of correlation between the direction that the camera faces and the expected turn direction; and
   generating instructions to control the autonomous vehicle based on the determined hidden context attribute of the traffic entity displayed in the received images.

2. The method of claim 1, wherein the expected turn direction is one of a left turn, a right turn, and no turn.

3. The method of claim 2, wherein the machine learning based model is configured to predict a different value for the hidden context attribute of the traffic entity for each of the left turn, the right turn, and no turn, the predicted value of the hidden context attribute indicating a likelihood of the traffic entity crossing paths with the autonomous vehicle.

4. The method of claim 1, wherein the hidden context attribute represents a likelihood of the traffic entity crossing paths with the vehicle.

5. The method of claim 4, wherein the hidden context attribute represents a degree of awareness of the traffic entity for the autonomous vehicle.

6. The method of claim 4, wherein the degree of awareness is independent of the turn direction.

7. The method of claim 1, wherein the machine learning based model is a convolutional neural network.

8. The method of claim 1, wherein the hidden context attribute represents statistical information describing a likelihood of each of a plurality of possible outcomes that an observer of the traffic may assign to the traffic entity, each outcome indicating a value representing a behavior of the traffic entity.

9. The method of claim 1, wherein the hidden context attribute represents a state of mind of a user represented by the traffic entity.

10. The method of claim 1, wherein the hidden context attribute represents a goal of a user represented by the traffic entity, wherein the user expects to achieve the goal within a threshold time interval.

11. The method of claim 1, wherein the machine learning based model outputs a hidden context attribute for each of a plurality of traffic entities captured in the images, and wherein generating signals for controlling the autonomous vehicle is based on motion parameters representing past and current motion and the hidden context attribute of each of the traffic entities.

12. A non-transitory computer readable storage medium storing instructions that when executed by a processor, cause the processor to perform steps comprising:
    receiving images captured by a plurality of cameras of an autonomous vehicle, the images displaying a traffic entity;
    determining an expected turn direction that the autonomous vehicle is planning on following within a threshold time interval;
    accessing a machine learning based model trained using training data including stimuli comprising traffic entities presented to a plurality of users and user responses received from the plurality of users, the user responses describing hidden context attributes of the traffic entities in the stimuli;
    providing the received images as input to the machine learning based model to determine an output for each of the plurality of cameras of the autonomous vehicle;
    determining a hidden context attribute of the traffic entity displayed in the received images as a weighted aggregate of the outputs determined for each of the plurality of cameras, wherein a weight of a camera is determined based on a degree of correlation between the direction that the camera faces and the expected turn direction; and
    generating instructions to control the autonomous vehicle based on the determined hidden context attribute of the traffic entity displayed in the received images.

13. The non-transitory computer readable storage medium of claim 12, wherein the expected turn direction is one of a left turn, a right turn, and no turn.

14. The non-transitory computer readable storage medium of claim 13, wherein the machine learning based model is configured to output a different value for the hidden context attribute for each of the left turn, the right turn, and no turn, the output indicating a likelihood of the traffic entity crossing paths with the autonomous vehicle.

15. The non-transitory computer readable storage medium of claim 12, wherein the machine learning based model is a convolutional neural network.

16. The non-transitory computer readable storage medium of claim 12, wherein the hidden context attribute represents statistical information describing a likelihood of each of a plurality of possible outcomes that an observer of the traffic entity may assign to the traffic entity, each outcome indicating a value representing a behavior of the traffic entity.

17. The non-transitory computer readable storage medium of claim 12, wherein the hidden context attribute represents a state of mind of a user represented by the traffic entity.

18. The non-transitory computer readable storage medium of claim 12, wherein the hidden context attribute represents a goal of a user represented by the traffic entity, wherein the user expects to achieve the goal within a threshold time interval.

19. A computer system comprising:
    a computer processor; and
    a non-transitory computer readable storage medium storing instructions that when executed by the computer processor, cause the computer processor to perform steps of:
    receiving images captured by a plurality of cameras of an autonomous vehicle, the images displaying a traffic entity;
    determining an expected turn direction that the autonomous vehicle is planning on following within a threshold time interval;
    accessing a machine learning based model trained using training data including stimuli comprising traffic entities presented to a plurality of users and user responses received from the plurality of users, the user responses describing hidden context attributes of the traffic entities in the stimuli;
    providing the received images as input to the machine learning based model to determine an output for each of the plurality of cameras of the autonomous vehicle;
    determining a hidden context attribute of the traffic entity displayed in the received images as a weighted aggregate of the outputs determined for each of the plurality of cameras, wherein a weight of a camera is determined based on a degree of correlation between the direction that the camera faces and the expected turn direction; and
    generating instructions to control the autonomous vehicle based on the determined hidden context attribute of the traffic entity displayed in the received images.

20. The computer system of claim 19, wherein the expected turn direction is one of a left turn, a right turn, and no turn.

* * * * *

UNITED STATES PATENT AND TRADEMARK OFFICE
CERTIFICATE OF CORRECTION

| | | |
|---|---|---|
| PATENT NO. | : 11,518,413 B2 | |
| APPLICATION NO. | : 17/321253 | |
| DATED | : December 6, 2022 | |
| INVENTOR(S) | : Anthony et al. | |

It is certified that error appears in the above-identified patent and that said Letters Patent is hereby corrected as shown below:

In the Claims

In Column 22, in Claim 19, Line 50, delete "and" and insert the same on Line 49 after "direction;" as a continuation of the paragraph.

Signed and Sealed this
Eighteenth Day of June, 2024

*Katherine Kelly Vidal*

Katherine Kelly Vidal
*Director of the United States Patent and Trademark Office*